3,389,539
MOWING MACHINES
Petrus Wilhelmus Zweegers, Eindhovenscheweg 2,
Geldrop, Netherlands
Filed July 6, 1965, Ser. No. 469,394
Claims priority, application Netherlands, July 11, 1964,
6407939; Oct. 9, 1964, 6411816; Feb. 19, 1965,
6502084
8 Claims. (Cl. 56—6)

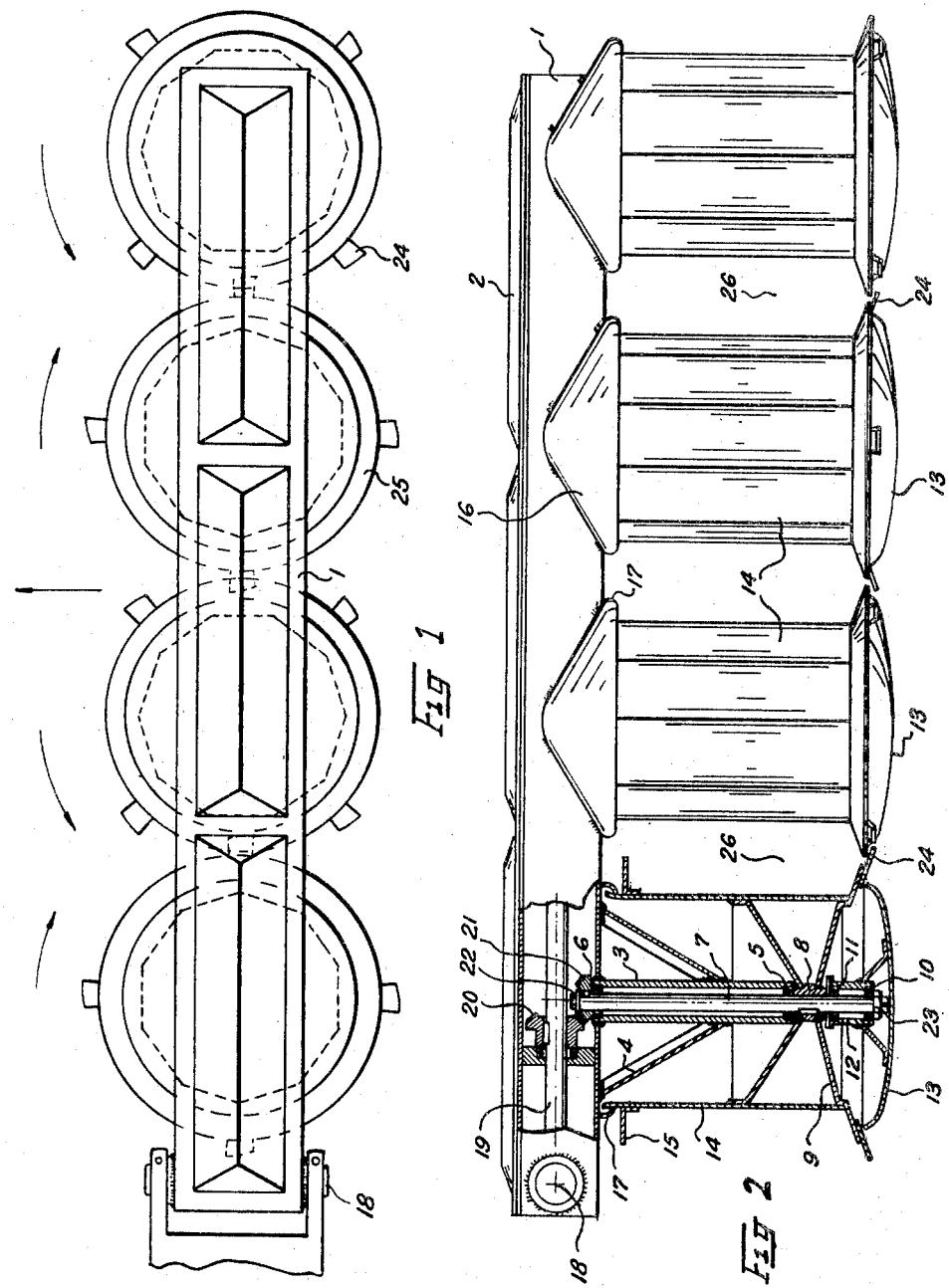

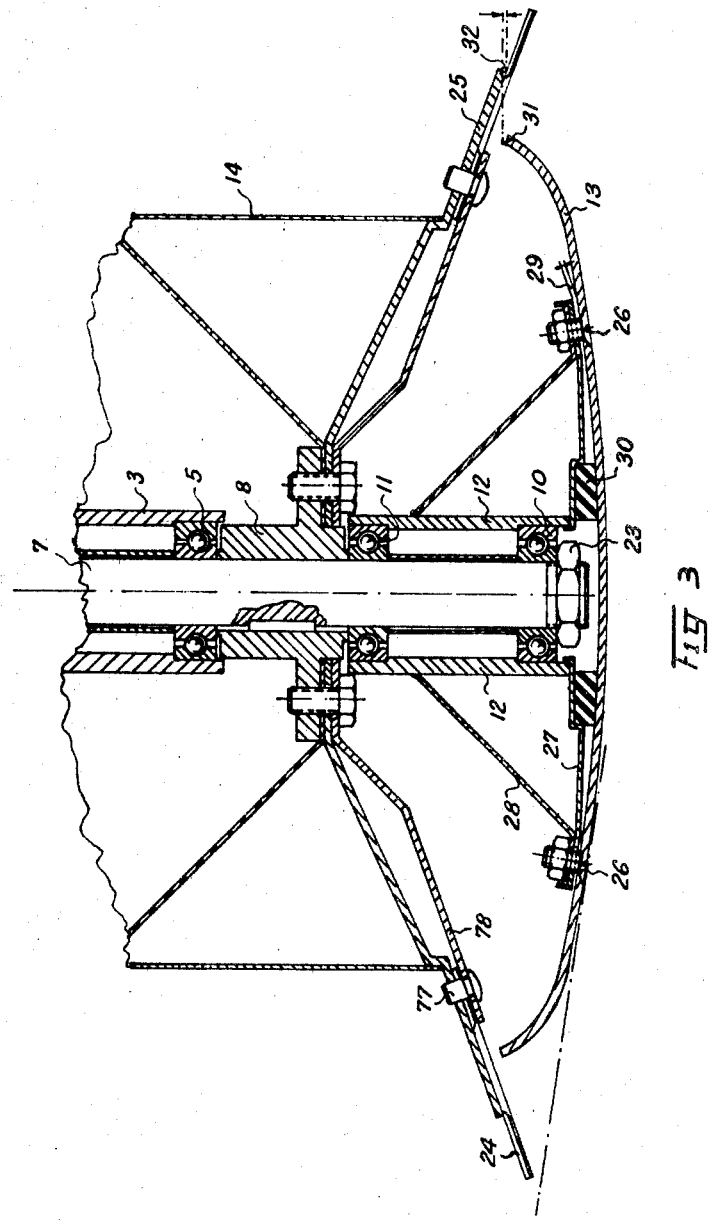

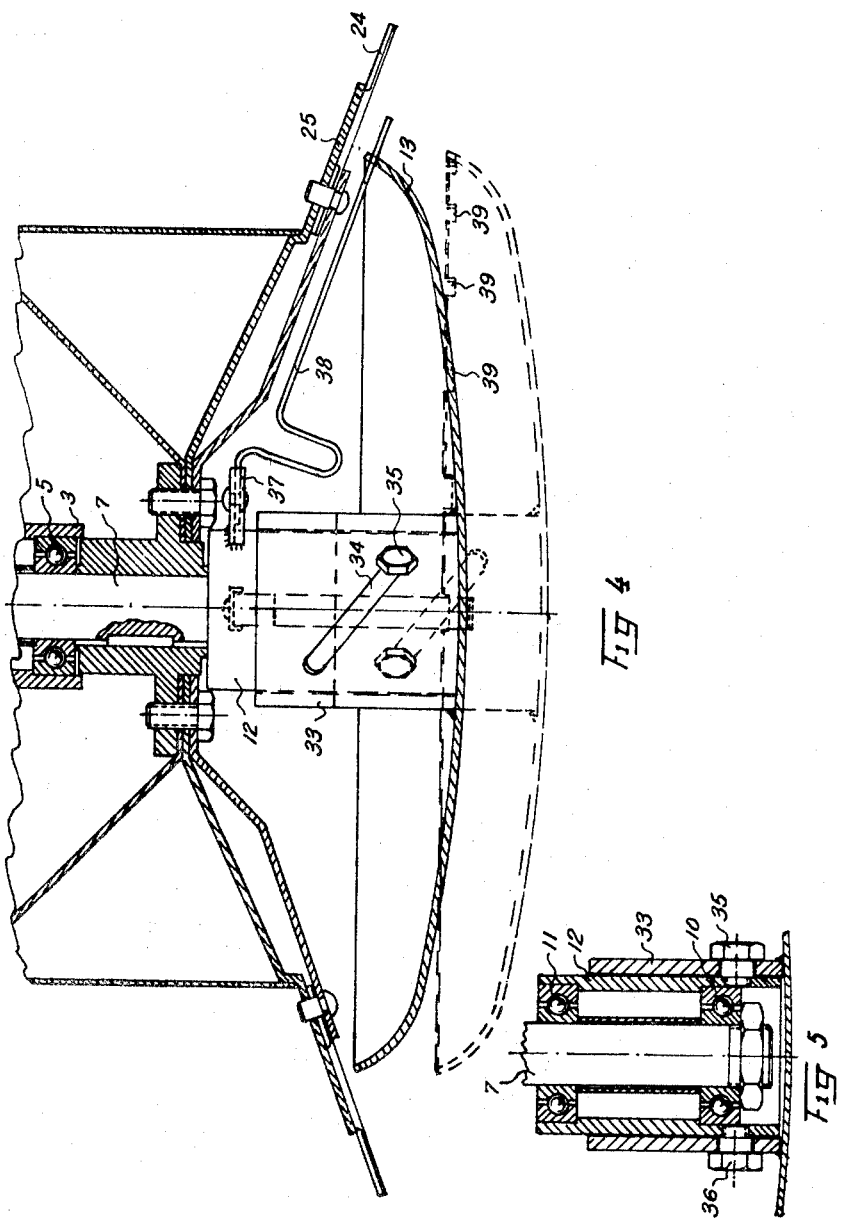

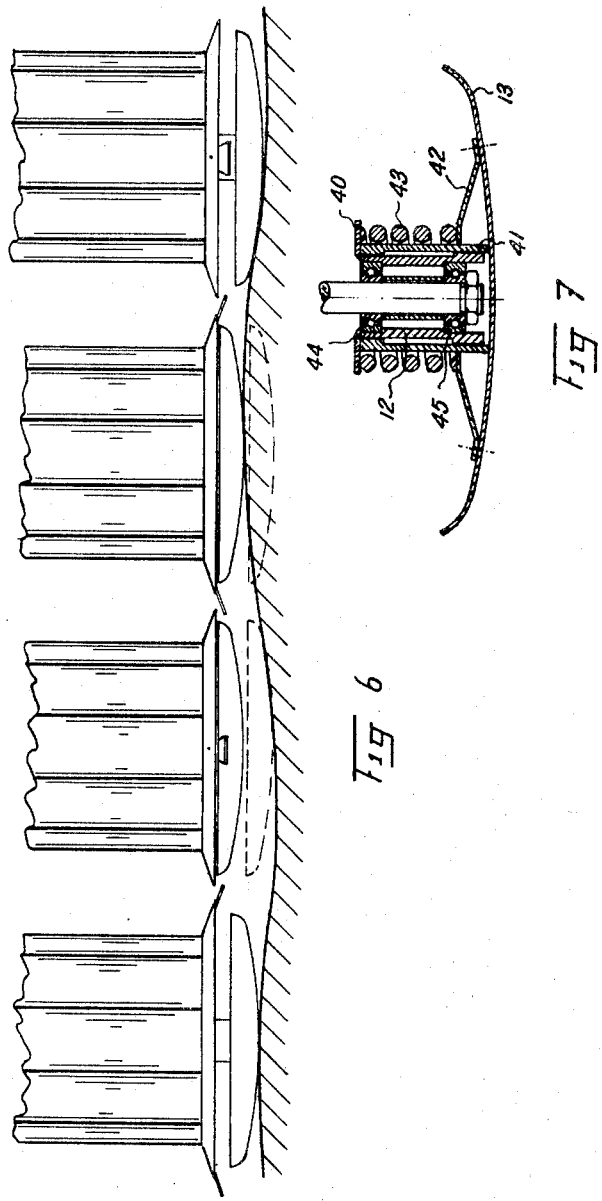

ABSTRACT OF THE DISCLOSURE

Mowing machine having at least one rotatable drum, each carrying an outwardly projecting flange at its lower end and cutters spaced apart around the periphery of the flange. A saucer-like ground-engaging support is mounted beneath each drum and is rotatable with respect to the drum about the axis of rotation of the latter. The margin of the support extends upwardly toward the flange and prevents dirt and cut crop from entering between the flange and support.

---

This invention relates to a mowing machine comprising a frame carrying at least one cutting device rotatable about a substantially vertical axis, the circumference thereof being provided with a least one cutter, further comprising a drive for the cutting device and a saucer shaped supporting member resting on the ground and mounted below the cutting device.

It has already been proposed, in a machine comprising a plurality of adjacent cutting devices, to construct the supporting members of the adjacent cutting devices as a unitary structure so that the unitary supporting member, being journaled in a plurality of points, it held against rotation and forms a shoe which glides over the ground so as to keep the cutters of the several cutting devices at the correct cutting height above the ground. However, this is only practical on relatively smooth fields, because on a rough field the shoe is not capable of keeping the individual cutting devices at their respective required cutting heights.

It is the object of the invention to provide such an arrangement that the several cutting devices of a machine can follow the shape of the field as closely as possible, so that the crop is cut as accurately as possible at the required height.

According to the invention, this object is obtained by providing an individual supporting member for each cutting device mounted for free rotation in a journal provided directly below the cutting device.

Thus, the supporting member, when sliding over the ground, will adapt itself to any bump of the field by rotating clockwise or anti-clockwise, dependent on the incidence upon the bump, and it will thus adjust the associated cutting device gradually to the correct cutting height.

In a preferred construction, the supporting member is journaled for free rotation on the lower end of the drive shaft of the cutting device.

To obtain an excellent adaptation of the cutting devices to an uneven field, especially in a machine having a plurality of cutting devices, it is preferred to mount the supporting member resiliently in the axial direction. Preferably, a rubber or metal spring is incorporated in the connection of the supporting member with its hub.

The height of the supporting member with respect to the cutting device is preferably adjustable so as to enable a selection of the desired cutting height.

The adjustability may be obtained by providing a sleeve centrally mounted on the saucer shaped part of the supporting member, said sleeve being provided with inclined slots and enclosing the bearing hub of the supporting member so as to be slidable and rotatable thereon, the movement of the sleeve with respect to the hub being guided by screws which are inserted into the hub through the inclined slots, such that by rotating the saucer with respect to the hub, the height of the supporting member with respect to the machine may be adjusted. The adjusting means of the supporting member may have a stepwise configuration so as to enable a fast adjustment to a certain desired height. A mounting in any of the several steps of adjustment may for instance be obtained by engagement of a resilient bar or the like in a selected one of a series of recesses in the edge of the saucer shaped part.

When the cutters are mounted against the lower surface of a truncated conical circumferential part of a collar, said circumferential part of the collar extends preferably in a cantilever fashion over the upper circumferential edge of the supporting member, such that the cutters extend through a ring shaped slot defined between the cutting disk and the supporting member. Thus, the supporting member provides on the one side a safeguard against the cutters flying away when they break away from the cutting disk, and moreover, this construction prevents plants and dirt from entering into the bearings of the cutting disk.

It has been found by experiments that good operation of the device is ensured when the saucer shape of the supporting member is so chosen that the radius of curvature of the saucer is greater than the maximum radius of the cutting circle, whereas the circumferential part of the disk is curved upwards at a smaller radius of curvature, such that the upper edge of the saurcer is positioned at about the same height or higher than the lower edge of the conical circumferential part of the collar.

This shape of the saucer increases the effect of the field adaptation provided by the freely rotatable supporting members and moreover it prevents contamination of the bearings. Finally, the cutting height can be selected at will. In combination, these features provide a very high efficiency.

The invention is now further illustrated with reference to the accompanying drawings.

FIG. 1 is a plan view of a machine according to the invention.

FIG. 2 is a rear view of the machine according to FIG. 1.

FIG. 3 is a section, to a larger scale, of a cutting device and supporting member.

FIG. 4 is a corresponding section of another embodiment of the supporting member.

FIG. 5 is a section of a detail of the supporting member according to FIG. 4.

FIG. 6 shows the field adaptation of the machine.

FIG. 7 is a section of another embodiment of the supporting member.

The mowing machine according to FIGS. 1 and 2 has a box-shaped frame beam 1 which is closed by a profiled cover 2. The left end of the frame beam 1 is provided with a pair of journals 18 by which it is so suspended from a tractor that it can pivot about a horizontal axis, and it protrudes laterally of the tractor. In the suspension device, there is also a vertical pivot axis so that the frame beam 1 can be pivoted to the rear of the machine when transported over the road. The suspension of the frame beam 1 is preferably connected to the three point linkage of the tractor, so that the position of the frame beam 1 may be adjusted.

Spaced over the length of the frame beam 1, the lower side thereof carries four downwardly directed tubes 3 which are welded to the beam 1, the connection being reinforced by inclined braces 4. Bearings 5 and 6 are mounted in each tube 3 and a shaft 7 is journaled in said bearings. Immediately below the bearing 5, the hub 8 of a drum 14 is fixed on the shaft 7 by means of a cotter connection. Below the hub 8, the shaft 7 carries two further bearings 10 and 11 which support the hub 12 of a support member 13 which rests on the ground. Each support member 13 is saucer shaped and it is journaled on the shaft 7 for free rotation thereon, by means of the bearings 10 and 11.

The drum 14 is profiled, e.g. in the shape of a regular decagon or in the shape of a cylinder with longitudinal projections, and it is connected to the tube via two ring flanges e.g., the lower ring flange 9 being continued outside of the drum so as to form a collar. Said collar 9 carries the cutters 24 against its lower surface. Although FIGS. 1 and 2 show four cutters 24 on each collar 9, two cutters per collar can be used advantageously in many cases. The cutter 24 is fixed in abutting relationship against the conical lower surface of the collar 9, preferably so that it can easily be replaced and so that it can pivot away when hitting a hard obstacle. The cutters of adjacent drums are so staggered with respect to each other that when the drums rotate, the cutters of adjacent drums do not touch each other.

The upper part of the drum circumference 14 may carry a ring 15 for closing the upper side of the discharge slot defined between two adjacent drums and this ring may also carry cutters. The upper end of each drum may be closed by a conical cap 16 welded to the frame beam 1. The inwardly bent edge 17 of the cap 16 fits with a small clearance about the circumference of the drum 14, so that it prevents plants and dirt from entering the drum.

The shafts 7 are driven from the tractor, i.e. by means of a shaft journaled concentrically in the journals 18 and connected by gearing to a main shaft 19 positioned in the frame beam 1. The main shaft 19 carries a bevel gear 20 near each drum which engages with a bevel gear 21 fixed on the upper end of the shaft 7. The direction of rotation of any drum 14 is determined by whether the associated bevel gear 20 is mounted to the right or to the left of the engaging bevel gear 21. In the embodiment according to FIGS. 1 and 2, the gears 21 are alternately mounted to the right and to the left of the associated gears 21.

At the upper end of the shaft 7, the parts mounted on this shaft are held by a nut 22, whereas at the lower end of the shaft 7, the bearings 10, 11 of the saucer 13 are held by a nut 23. The radius of curvature of the saucer 13 is greater than the radius of the circumference of the outer conical part 25 of the disk 9. The circumferential part of the support member 13 is curved upwards at a smaller radius of curvature and it ends at about the same height as the lower edge of the conical collar 25 of the disk 9, see the arrows at the right of FIG. 3.

When mowing, the machine is moved over the field by a tractor in the direction indicated by an arrow in FIG. 1, whereas the several drums 14 rotate in the directions indicated also by arrows in FIG. 1. The crop is cut by the cutters 24, it is conveyed by the profiled drums through the discharge slot defined between each pair of co-operating drums and it is deposited behind the machine in the form of two swaths. When mowing, the machine rests on the saucers 13 which slide over the ground and follow the bumps of the field while freely rotating about the shaft 7, in the direction dictated by the incidence of the saucer against the bump. Instead of mounting the saucers on the shaft 7, they may be mounted on a separate part provided below the disk 9.

A shock absorbing action is obtained in the embodiment according to FIG. 3 in that the saucer 13 is held with clearance (see at 29) by screws 26 on a supporting ring 27 and on a supporting cone 28, which parts 27 and 28 are welded to the hub 12, and a rubber ring 30 is inserted between the saucer 13 and the supporting ring 27. If desired, the rubber ring 30 may be replaced by a set of dished plate springs. It is apparent from this figure that the cutters 24 protrude through the ring shaped slot defined between the upper edge 31 of the saucer and the lower edge 32 of the conical part 25 of the cutting disk, which latter edge is somewhat lower and further outward than the upper edge of the saucer.

In the embodiment according to FIG. 4, the saucer 13 can be axially adjusted. A sleeve 33 is centrally welded on the saucer 13 and it is provided with inclined slots 34. Through the slots 34, screws 35 and 36 ore screwed into the hub 12, such that the sleeve 33 may move with respect to the hub 12, said movement being guided by sliding of the screws 35 and 36 with respect to the inclined slots 34, see also FIG. 5. A lip 37 is welded to the upper part of the hub 12, and a resilient rod 38 is riveted to the lip 37. The height of the saucer 13 with respect to the hub 12, thus with respect to the cutting circle of the cutters 24, may be changed by lifting the rod 38, rotating it with respect to the saucer 13 and lowering it into one of a series of recesses 39 provided in the circumference of the saucer 13 for fixing the desired cutting height.

In FIGS. 6 and 7, the saucers have a resilient connection with the cutting devices, which expedient may be used alone or in addition to the adjusting means of FIG. 4 or the shock absorbing means according to FIG. 3. It is preferred to provide the axial resilience only in a few of the cutting devices of a mowing machine, e.g. in two cutting devices if the machine comprises a total of four cutting devices, so that there are e.g. two supporting members which have a fixed height with respect to their associated cutting devices and thus provide fixed supports for the machine, whereas the remaining cutting devices adapt themselves to the shape of the field. As shown in FIG. 6, such an arrangement gives the result that all four saucers have a permanent contact with the field. According to FIG. 7, a pre-stressed compression spring 43 is inserted between a collar 40 welded to the upper end of the hub 12, and a ring 42 mounted on the saucer 13. The sleeve 41 of the saucer 13 can make an up and down movement with respect to the hub 12 against the action of the spring and said up and down movement is limited by stops 44 on the sleeve 41 and 45 on the hub 12 respectively.

The axial resilience of the saucer may of course also be obtained in a different way, e.g. hydraulically.

What I claim is:
1. A mowing machine comprising
 (a) a frame,
 (b) at least one rotary cutting device carried by said frame, said cutting device including a flange supported for rotation about a substantially vertical axis, and at least one cutter carried by and rotatable with said flange, said cutter projecting beyond the outer edge of said flange, and
 (c) a ground-engaging support for each cutting device, said support having a circular saucer-like shape and being mounted below said flange for rotation with respect to said flange about the axis of rotation of said flange, said support having a downwardly directed ground-engaging surface of convexly curved configuration, the external diameter of said support being greater than the radius of but less than the diameter of the circular path through which its associated cutter moves, the radius of curvature of said ground-engaging surface being greater than the radius of the path through which the outer edge of said cutter moves, and said support having an upwardly extending peripheral margin, the outer face of said margin being convexly curved and having a radius of curvature smaller than the radius of curvature of said ground-engaging surface, the free edge of said margin facing the lower face of said flange, said edge and flange face being close enough to each other to restrict the ingress of dirt and cut crop between them.

2. A mowing machine as defined in claim 1, including a plurality of said cutting devices, each device including a drum rotatable about the axis of rotation of each flange, each flange being mounted on the lower end of its corresponding drum, said drums being in laterally spaced-apart relation to define a discharge gap between them, each flange extending above a portion of the path through which the cutter of an adjacent drum moves.

3. A mowing machine as defined in claim 2 wherein said drum flanges are all disposed at the same horizontal level when the machine is moving over horizontal level ground, and each flange having a frusto-conical configuration so as to be inclined downwardly toward its outer edge, said cutters being in the form of plates secured to the underside of each flange substantially parallel thereto so as to be inclined downwardly in a direction toward the outer periphery of the cutter, whereby a clearance is provided between the upper face of each cutter and the edge of the next adjacent flange.

4. A mowing machine as defined in claim 1 wherein each support is movable axially upward with respect to its associated flange, and including resilient means for resisting such upward movement, whereby each support is maintained in engagement with the ground despite irregularities in the ground surface.

5. A mowing machine as defined in claim 1 including a shock absorber operably interposed between each support and its associated flange.

6. A mowing machine as defined in claim 1 including means for maintaining said support at various vertical spacings from its respective flange.

7. A mowing machine as defined in claim 6 including a hub for carrying said support, and wherein said maintaining means includes a sleeve concentrically surrounding said hub, a plurality of inclined slots in said sleeve, and studs projecting radially from said hub through said slots.

8. A mowing machine as defined in claim 7 including a resilient member projecting radially from said hub, and a series of peripherally spaced-apart recesses in the edge of said support adapted to accommodate said resilient member.

References Cited
UNITED STATES PATENTS

| | | | |
|---|---|---|---|
| 2,549,317 | 4/1951 | Laughlin | 56—25.4 |
| 2,669,826 | 2/1954 | Watrous | 56—25.4 |

RUSSELL R. KINSEY, *Primary Examiner.*